United States Patent
Dawe

(10) Patent No.: US 6,219,158 B1
(45) Date of Patent: Apr. 17, 2001

(54) METHOD AND APPARATUS FOR A DYNAMICALLY VARIABLE SCANNER, COPIER OR FACSIMILE SECONDARY REFLECTIVE SURFACE

(75) Inventor: Julie T. Dawe, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/127,654

(22) Filed: Jul. 31, 1998

(51) Int. Cl.$^7$ ........................................... H04N 1/46
(52) U.S. Cl. ..................... 358/509; 358/505; 358/474; 358/475; 358/486; 358/488; 355/75; 399/380; 399/379
(58) Field of Search ..................... 358/504, 509, 358/510, 516, 475, 483, 474, 496, 497, 471, 488; 382/312, 313; 250/208.1; 355/68, 75, 181; 399/32, 51, 152, 198, 7, 378, 379, 380

(56) References Cited

U.S. PATENT DOCUMENTS

| | | |
|---|---|---|
| 4,623,938 | 11/1986 | Asano et al. ........................... 358/285 |
| 4,671,642 * | 6/1987 | Ohkubo et al. ....................... 355/3 R |
| 5,278,674 | 1/1994 | Webb et al. ........................... 358/475 |
| 5,790,211 * | 8/1998 | Seachman et al. ..................... 349/3 |

* cited by examiner

Primary Examiner—Cheukfan Lee
(74) Attorney, Agent, or Firm—Cynthia S. Mitchell

(57) ABSTRACT

A reflective surface behind an image to be scanned on an optical image scanner, copier, facsimile machine or similar device. This reflective surface is dynamically adaptive to the item being scanned, copied or faxed to provide improvements such as reducing image bleed-through while maintaining a desirable level of dynamic range. Preferably, the reflective surface has a reflectance that is dynamically variable and controlled to be either all white, all black, all grey or some other color. The scanning or copying reflective background may also be varied in different regions, such that different regions of the reflective background may simultaneously be white, black, grey, or some other color. The background reflective surface of the scanner, facsimile or copier may be controlled directly by an operator or end user or by software or firmware of the scanner, copier or facsimile. The dynamically variable reflective surface of the scanner, facsimile or copier may be an LCD.

9 Claims, 3 Drawing Sheets

METHOD AND APPARATUS FOR A DYNAMICALLY VARIABLE SCANNER, COPIER OR FACSIMILE SECONDARY REFLECTIVE SURFACE

RELATED APPLICATION

Copending application Ser. No. 09/016,562, entitled Reflector for Document Scanner of Copier, filed Jan. 30, 1998, which is a continuation-in-part of application Ser. No. 08/610,032, filed Mar. 4, 1996.

FIELD OF INVENTION

This invention relates generally to scanners, copiers, facsimile machines and other devices used for transforming an optical image of a document into a electronic signal and more specifically to a reflective surface used behind a document to be imaged.

BACKGROUND OF THE INVENTION

Electronic document scanners, copiers, and facsimile machines transform an optical image of a document into an electric signal suitable for storing, displaying, printing or electronic transmission. Documents to be scanned may generally be classified as either transparent or opaque. For opaque documents, light is reflected off an image on the surface of the document onto a photosensitive transducer, typically a photoconductive drum or an array of photosensitive sensor elements. However, documents are rarely completely opaque. In a typical device, some light passes through the document to a secondary reflective surface, for example a lid or automatic document feeder. Some light then reflects off the secondary reflective surface and passes back through the document a second time. The light that passes through the document twice may also be detected by the photosensitive transducer. If the document has an image on both sides, the image adjacent to the secondary reflective surface may be partially imaged onto the photosensitive transducer. For example, when copying double sided documents, sometimes an image on the back of the document partially appears in the resulting copy. This undesirable result is often called "bleed-through." There is a need for reduction of bleed-through in copiers, scanners, facsimile machines and similar devices.

SUMMARY OF THE INVENTION

An improved document lid and secondary reflective surface is provided that minimizes bleed-through and affects other image parameters of interest, such as brightness, contrast and color shift. The document lid and secondary reflective surface, which is the scanning or copying background is dynamically variable and controlled to be either all white, all black, grey or some other color. The scanning or copying background can also be varied in different regions, such that different regions can simultaneously be white, black, grey or some other color. The scanning or copying background may be directly controlled by the user or by a preview scan and software or firmware that adjusts the background to minimize the effects of bleed-through during the scanning/copying process.

DETAILED DESCRIPTION OF THE PREFERRED EMBODIMENT OF THE INVENTION

Figure 1:
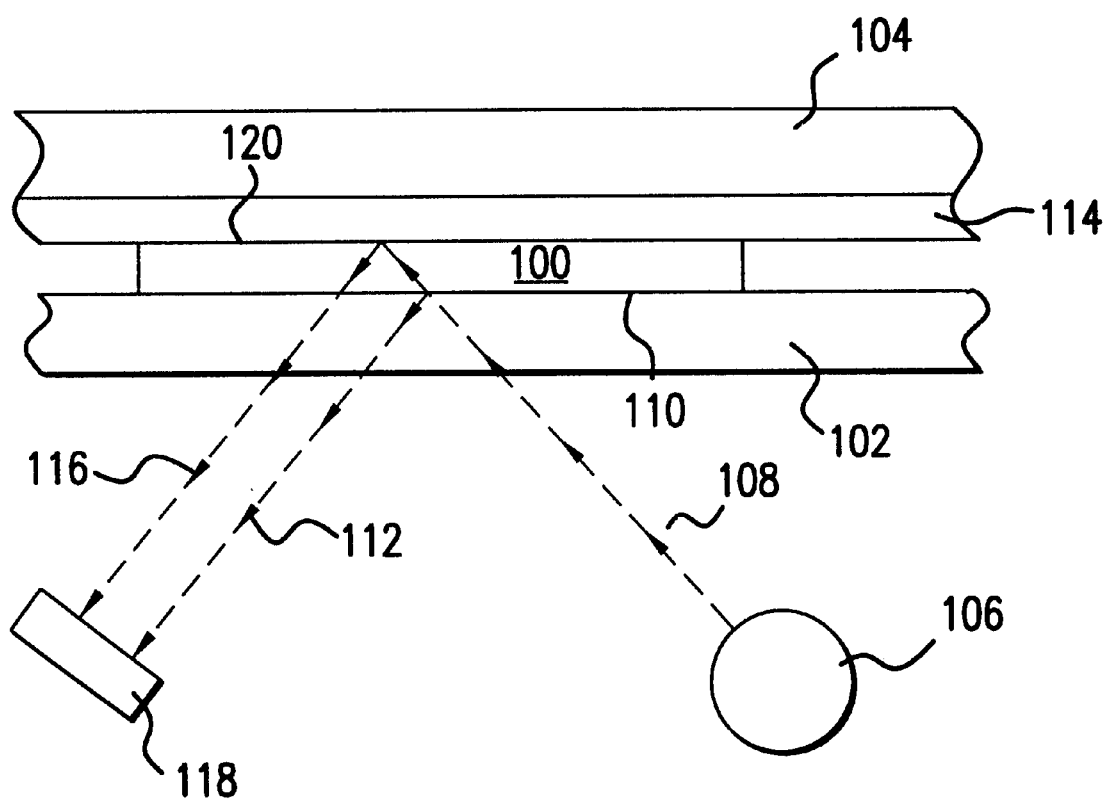
FIG. 1 illustrates a cross section of an imaging device cover including a secondary reflective surface in accordance with the present invention.

FIG. 1 shows a document 100, laying face down on a transparent platen 102, with a lid or automatic document feeder 104 over the document 100. The document 100 has an image on a front face 110, and perhaps a second image on a back face 120. The lid or automatic document feeder 104 provides a dynamically variable background secondary reflective surface 114. A lamp 106 provides light rays 108. Most of the light rays 108 reflect off the front face 110 of the document 100, generating front reflected light rays 112. However, some of the light rays 108 pass through the document 100, reflect off of the dynamically variable background secondary reflective surface 114, passing through the second image on the back face 120 of the document, and back through the document 100, generating secondary reflected light rays 116. Both light rays 112 and 116 are received and transformed by a photosensitive transducer 118. Transducer 118 may be a photosensitive drum or an array of photosensitive elements or a single light beam may be scanned and reflected onto a single sensor.

FIG. 1 is simplified in that scanning devices typically include lenses, mirrors and other optical components not relevant to the invention. It should be noted that FIG. 1 may represent a copier, facsimile or scanner. In the interest of simplicity, a scanner will be described. However, the present invention also applies to copiers and facsimiles. The present invention also applies equally well to flat bed/stationary document machines or automatic document feeding machines. The figure is also simplified in that it shows only the specularly reflected light (light reflected from an object at a reflection angle equal to the incident angle) and not the scatteredly reflected light (all light reflected from an object at reflection angles not equal to the incident angle, sometimes referred to as diffuse light) which is also present. As is well known in the art, sensor 118 of an optical scanner may be positioned as shown in FIG. 4 to sense specularly reflected light or may be positioned at a location offset from that shown in FIG. 4, for example directly beneath the point of incidence on object 100, to sense scatteredly reflected light.

The secondary reflected light rays 116 are of particular concern when scanning or copying color images, where accurate (as perceived by the human visual system) color reproduction is needed. For example, if the secondary reflective surface 114 were white, bleed-through would be evident with some pages that are printed on both sides, such as pages from magazines, which are often thin paper printed on both sides. If the secondary reflective surface 114 were black or non-reflective, this would eliminate the secondary reflected light rays and resulting bleed-through problem. However, a black background tends to darken the entire scan bed resulting in undesirable skin tones in photographs and dark overtones in white paper.

A black surface may create other undesirable effects as follows. First, consider dynamic range (or contrast) of an image, which is the difference in reflectance between the darkest part of the image (sometimes called shadow) and the lightest part of the image (sometimes called highlight). Document 100 is typically paper. If light is permitted to reflect back through the light areas of an image, the light areas appear to be whiter, increasing the effective dynamic range. For an extreme example, consider an image on thin tissue paper. When viewed on a white background, the light areas of the image will appear white. When viewed on a black background, the light areas will shift toward gray, reducing the dynamic range of the image.

Second, a black background can cause a color shift. White paper typically acts as an optical filter, suppressing short wavelengths and passing long wavelengths. That is, white paper typically has a higher transmission for red and green wavelengths than for blue wavelengths. Again, using the extreme example of an image on thin tissue paper, when viewed on a white background, reds and greens appear relatively saturated and bright. When viewed on a black background, reds and greens appear less saturated. Subjectively, red tends to appear relatively dull or brick colored. Therefore, for both dynamic range and color shift reasons, a completely non-reflective surface 114 is not preferred.

Another option for a secondary reflective surface 114 is to use grey, which reduces the bleed-through problem without darkening the scan bed as much as black. However, the contrast of the scan bed is reduced, which may make it more difficult to automatically detect the presence of a document on the scan bed.

The Applicant has discovered that the optimal secondary reflective surface is dependent upon the specific item being scanned, copied or faxed. It would be optimal for software or firmware to adjust the background automatically based upon the item to be scanned, copied or faxed. Alternatively, the end user could change the color of the secondary reflective surface based on the document to be scanned, copied or faxed.

This may be accomplished in the present invention wherein the secondary reflective surface 114 has a dynamically variable reflectance, which may be controlled by the end user or operator of the scanner, copier or facsimile using buttons or some other form of input to indicate that a white, black, grey or color secondary reflective surface is to be used during the scan. Alternatively, software that determines the best color for the secondary reflective surface dependent on the item being scanned, copied or faxed may be included in the software or firmware that controls the copier, scanner or facsimile. The dynamically variable secondary reflective surface 114 of the present invention may be an LCD screen, similar to the displays used in notebook computers. The LCD screen may be placed over the document to be scanned in the same manner that a lid is placed over a document to be scanned.

There could be hardware controls for the end user or operator to change the screen color and also software controls. Software or firmware may be used to automatically search for bleed-through and color shift after a preview scan. The software or firmware could then change the screen color if necessary to reduce bleed-through, adjust the total dynamic range, or color shift problems after the preview scan is analyzed. The software could then initiate the actual scan of the document or perform another preview scan and readjust the screen color as necessary until the bleed-through, total dynamic range and color shift are within predetermined limits. The software may also adjust different portions of the dynamic background, so that different portions of the dynamic background or secondary reflective surface 114 are darkened or lightened where appropriate, such as when a magazine page with both text and photographs is being scanned.

Since the secondary reflective surface 114 is dynamically variable, it can be controlled to be all white, all black, all grey, or some other color. It can also have different regions that may be of different colors. That way, if there are variable items on the scanner, part of the secondary reflective surface 114 may be dark behind an item with bleed-through, and lighter behind a photograph with skin tones having color shift issues. If all items require bleed-through adjustment, the entire secondary reflective surface 114 may be black. If all items on a document are merely text on white paper, the background may be adjusted to white. Scanner software or firmware may automatically control the secondary reflective surface 114 by means of detection algorithms. The secondary reflective surface 114 could be manually controlled by an end user or operator for the appropriate background.

Alternatively, the secondary reflective surface 114 may be controlled by a combination of manual control and automatic software. For example, the end user may simply select a background for simple situations such as all text on white paper, OCR, photographs, or slides. And in the alternative, the end user may select a background and then select automatic adjustment, wherein the software may perform a preview scan with the initial background selected by the user and then make finer adjustments to the back ground in order to minimize bleed-through and color shift.

Figure 2:
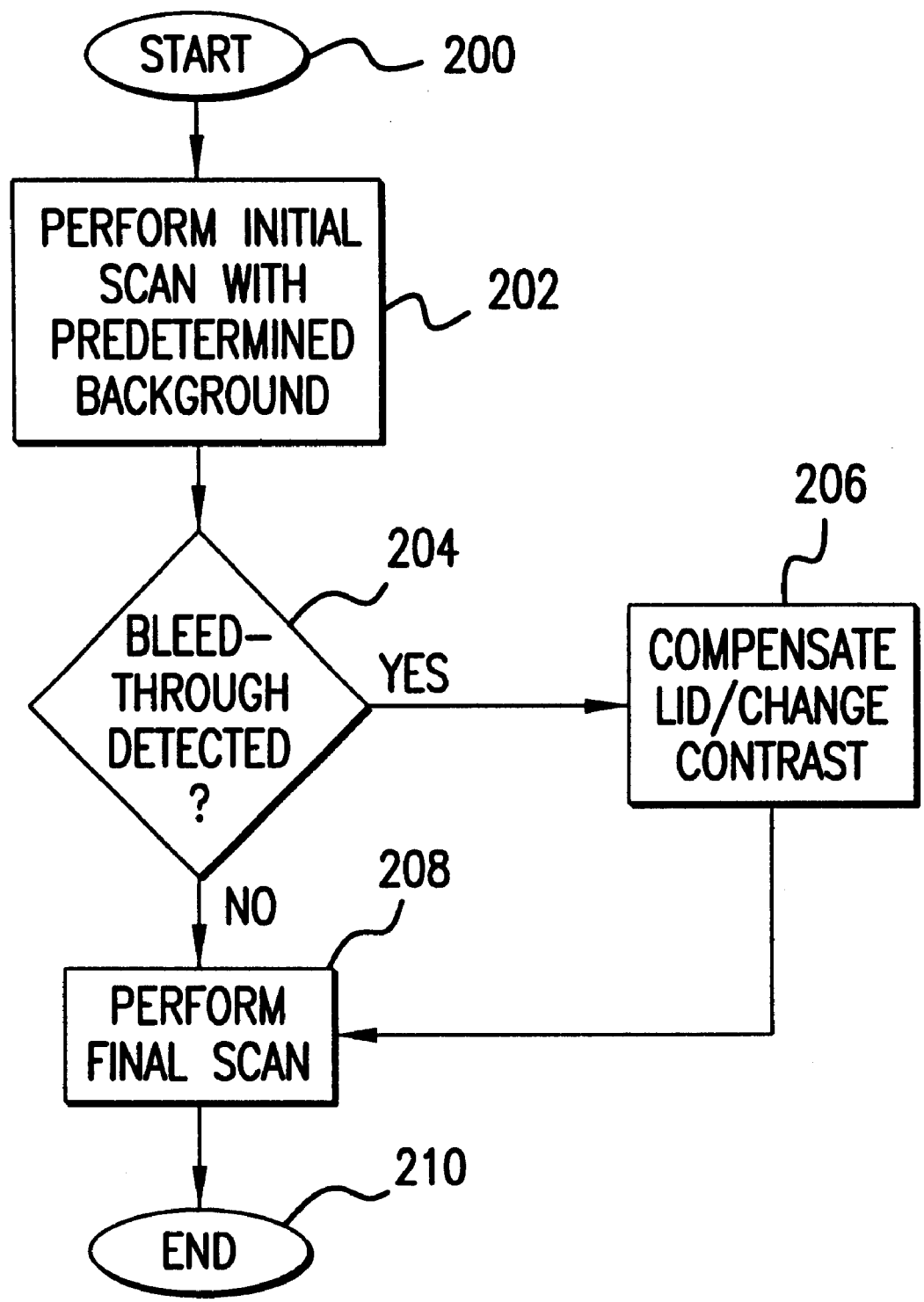
FIG. 2 shows a flow chart of a first embodiment of the present invention.

FIG. 2 shows a flow chart in which an initial or preview scan is performed with a predetermined background color at 202. Software determines the bleed-through and color shift at 204. If the bleed-through and color shift were within predetermined limits, a final scan is performed 208. If the bleed-through or color shift was greater than the predetermined limits, the internal software changes the contrast or color of the secondary reflective surface 114 at 206 and then performs the final scan 208.

Figure 3:
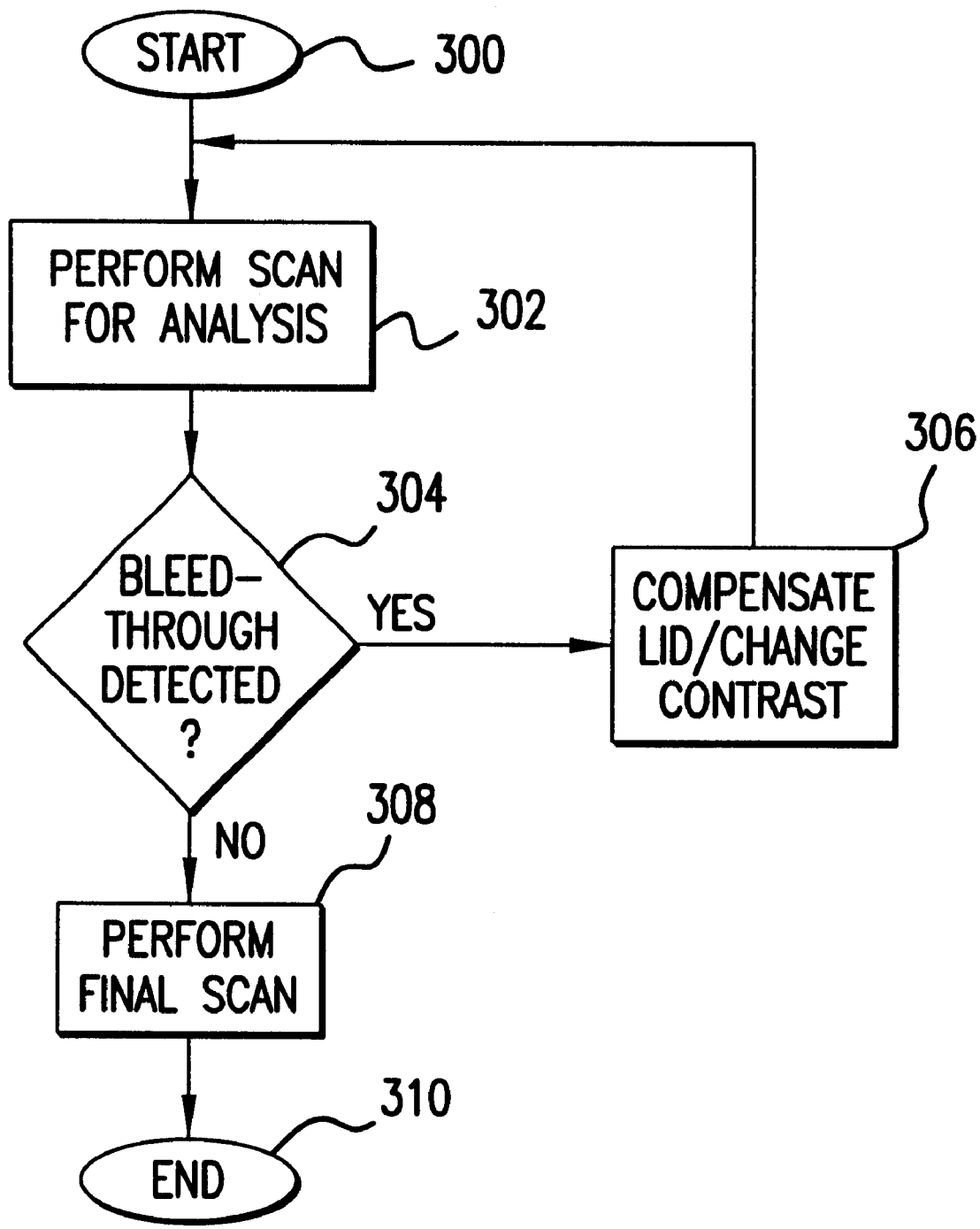
FIG. 3 shows a flow chart of a second embodiment of the present invention.

FIG. 3 shows a flow chart of a second embodiment of the present invention wherein an initial or preview scan is performed with a predetermined background color 302. Internal software determines the bleed-through and color shift 304. If the bleed-through and color shift were within predetermined limits, a final scan is performed 308. If the bleed-through or color shift was greater than the predetermined limits, the software or firmware changes the contrast or color of the secondary reflective surface 114. Then another preview scan is performed with the background at the newly adjusted color. The bleed-through and color shift are then recalculated 304 and if they are within predetermined limits, a final scan is performed 308. If the bleed-through and color shift are still not within predetermined limits, the secondary reflective surface 114 is adjusted again and another preview scan is performed. This loop is continued until the bleed-through and color shift are within the predetermined limits, at which time the final scan will be performed.

The foregoing description of the present invention has been presented for purposes of illustration and description. For example, rather than being a flat bed scanner with the background secondary reflective surface 114 being an LCD screen, the present invention may be an automatic document feed scanner with the background secondary reflective surface 114 being a single line of LCDs. Also, rather than using and LCD screen as the dynamically variable secondary reflective surface 114, technology such as that used inside of windows to permit the window to be alternated between permitting light through and opaque with the flip of a switch may alternatively be used. The foregoing description is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A device for electronically transforming an image into an electronic signal, the image located at a first surface, the device comprising:

an area adapted to receive a document, the document having a first image on a first side and a second image on a second side, the first image located at the first surface; and a reflective surface adjacent to the second side of the document;

wherein the reflective surface has a dynamically variable reflectance;

wherein the reflectance of the reflective surface is controlled by means of software; and wherein the reflectance of the reflective surface varies in response to the color intensity of the document to be scanned or copied.

2. An imaging device for producing electronic data representative of an image of an object comprising:

a transparent platen adapted to support said object; and a cover member having a reflective surface and having an operating position with said reflective surface positioned adjacent to said object supported on said platen, said reflective surface being selectively variable through a range of contrast including at least white, gray and black.

3. The imaging device of claim 2, said reflective surface said reflective surface being selectively chromatically variable.

4. The imaging device of claim 2, the reflectance of said reflective surface being selectively variable across said reflective surface whereby the reflectance of different portions of said reflective surface are variable with respect to each other.

5. The imaging device of claim 4, said reflective surface being selectively chromatically variable.

6. An imaging device for producing electronic data representative of an image of an object comprising:

a transparent platen adapted to support said object; and a cover member having a reflective surface and having an operating position with said reflective surface positioned adjacent to said object supported on said platen, said reflective surface being selectively chromatically variable.

7. An imaging device for producing electronic data representative of an image of an object comprising:

a transparent platen adapted to support said object; and a cover member having a reflective surface and having an operating position with said reflective surface positioned adjacent to said object supported on said platen, the reflectance of said reflective surface being selectively variable across said reflective surface whereby the reflectance of different portions of said reflective surface are variable with respect to each other.

8. The imaging device of claim 7, said reflective surface being selectively chromatically variable.

9. A method for transforming an image on a document into an electronic signal using an image processing device, said method comprising:

(a) placing said document on a document support surface;

(b) lowering a lid to cover a back side of said document on said support surface, said lid having a dynamically variable reflective surface opposed to said support surface;

(c) selecting a reflectance level for said dynamically variable reflective surface;

(d) illuminating said document on said support surface with a light source; and (e) producing an electronic signal in response to light reflected by said document:

wherein said dynamically variable reflective surface is an LCD;

wherein the step of selecting a reflectance level for said dynamically variable reflective surface further comprises:

(1) performing a preliminary scan; and (2) adjusting said reflectance level in response to bleed-through levels, dynamic range levels or color shift detected during said preliminary scan.

* * * * *